July 20, 1965  L. H. SCHALL  3,196,243
HIGH FREQUENCY HEATING SYSTEM
Filed Feb. 26, 1963  4 Sheets-Sheet 1

INVENTOR
LOUIS H. SCHALL
BY Herbert W. Arnold
ATTORNEY

July 20, 1965 L. H. SCHALL 3,196,243
HIGH FREQUENCY HEATING SYSTEM
Filed Feb. 26, 1963 4 Sheets-Sheet 2
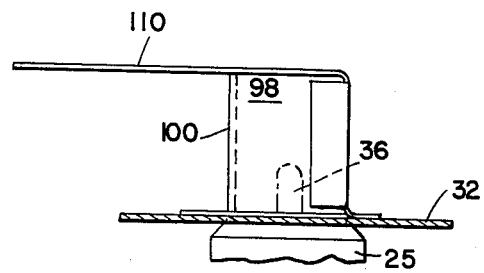
FIG. 3
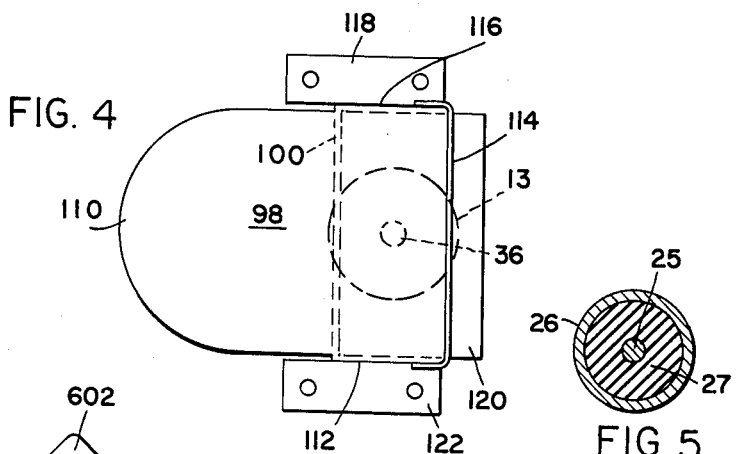
FIG. 4
FIG. 5
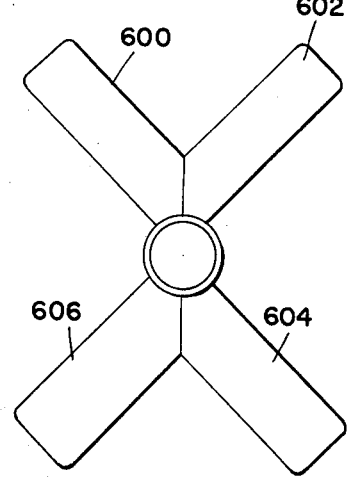
FIG. 6A
FIG. 6B
INVENTOR
LOUIS H. SCHALL
BY Herbert W. Arnold
ATTORNEY July 20, 1965

L. H. SCHALL 3,196,243

HIGH FREQUENCY HEATING SYSTEM

Filed Feb. 26, 1963

INVENTOR
LOUIS H. SCHALL

BY *Herbert W. Arnold*

ATTORNEY

July 20, 1965  L. H. SCHALL  3,196,243
HIGH FREQUENCY HEATING SYSTEM
Filed Feb. 26, 1963

INVENTOR
LOUIS H. SCHALL
BY Herbert W. Arnold
ATTORNEY

United States Patent Office 3,196,243
Patented July 20, 1965

3,196,243
HIGH FREQUENCY HEATING SYSTEM
Louis H. Schall, Dedham, Mass., assignor to Raytheon Company, Lexington, Mass., a corporation of Delaware
Filed Feb. 26, 1963, Ser. No. 261,028
11 Claims. (Cl. 219—10.55)

This invention relates generally to the use of high frequency electromagnetic energy in combination with conventional thermal and infrared energy in an electric oven for heating or cooking materials, and more particularly to novel structures for feeding said high frequency energy into a conventional electric oven which may have unshielded or exposed infrared heater elements mounted therein.

In order to enhance the commercial acceptance of the use of high frequency or microwave electromagnetic energy for the cooking or heating of foodstuffs or other materials, it has been found desirable to combine means for utilizing the microwave energy in combination with conventional thermal or infrared energy in the same oven cavity. Such a combined structure provides a versatile cooking or heating apparatus and also assures that foodstuffs, for example, cooked rapidly with high frequency energy also have an appetizing browned surface that is appealing to the eye and taste of the consumer.

Heretofore, in order to provide such combination cooking, it has been found necessary to construct, first of all, an oven cavity suitable for microwave cooking and then subsequently to adapt conventional infrared heating elements for use within the microwave-designed oven. Such a procedure tends to be more costly to the producer and also raises the cost to the consumer by requiring him to purchase an additional microwave oven structure to supplement whatever conventional electric oven structure he may already own and be using at the time.

It is, therefore, advantageous to be able to provide a microwave feed system that can easily be adapted for use in any conventionally designed electric ovens that are presently available in the commercial consumer market. In this way, present day electric oven manufacturing techniques are made available for microwave oven use and it is possible to market in an acceptable commercial manner either a simple means for adapting existent ovens for use with microwave energy or a combination oven based on conventional electric oven design having a microwave feed system included therein. Previous to this invention no successful means for adapting existent electric oven configurations for use with microwave energy sources has been devised. It has been previously believed necessary to provide, first of all, specially designed oven cavities for microwave use, and then to attempt to adapt conventional electric elements therein.

Moreover, in many present day conventional electric ovens the broiler and/or baking elements are constructed in such a way that the heater element itself comprises an unshielded, open-wire structure; that is to say, the element which provides infrared or thermal energy for broiling and/or baking may utilize, for example, an exposed Nichrome wire helically wound in a continuous coil and suitably mounted on a structure placed within the oven cavity.

Heretofore it has been possible to combine microwave energy and conventional electric energy only in an oven cavity having baking and/or broiling elements which are of the shielded or "Calrod" type, in which, for example, a Nichrome heater wire is enclosed by a tubular metallic shielding material so that the over-all element is in the form of a coaxial device with a dielectric or insulative material placed between the heater wire and the external shield. The shield is then physically attached to the oven cavity so that a good electrical ground is obtained.

Prior to this invention, however, it has not been possible to utilize microwave energy within an oven cavity in combination with an unshielded or open-wire type of broiler and/or baking element because, with such an element, microwave energy is lost through the input leads of the heater wires which act as antennae to radiate high frequency microwave energy from the oven cavity outwardly into the surrounding atmosphere. This invention, however, provides an operable combination so that the microwave feed adapting system of the invention can be utilized in any conventional electric oven whether or not it uses shielded or unshielded types of infrared heating elements.

In the invention the microwave energy is inserted through an opening in the bottom of the oven cavity so that the energy is conveyed upwardly into that region of the oven generally located within the perimeter described by the bottom, or baking, element located in the lower portion of a conventional electric oven. The opening into the bottom wall of the oven cavity is fed by a conventional high frequency electromagnetic energy source, such as a magnetron. A feed-adapter comprising a metallic enclosure open at one end and having a dielectric cover over the open end is positioned over said source to prevent overcoupling of the energy source. A mode-stirring device is positioned adjacent the feed-adapter and within the oven to provide an upward radiating energy mode pattern distribution for uniform heating of the material that is being cooked in the oven. In an alternate embodiment of the invention a conventional oven is fed from an electromagnetic energy source by means of a waveguide opening into the bottom wall of the oven, said waveguide including therein a mode-stirring device to provide uniform energy mode distribution.

For a conventional electric oven utilizing open-wire, unshielded infrared heating elements, means are provided at the input terminals of the heating wire excitation leads to prevent external leakage of microwave energy by radiation from the wires. In a preferred embodiment of the invention such means include a choke device comprising a pair of quarter-wave section coaxial transmission lines, the inner conductors of which are connected to the ends of the exposed heater wire. The other ends of the inner conductors are capacitively shorted to the choke housing by a suitable capacitor disc arrangement.

The invention further discloses a door structure, compatible with both thermal and microwave energy cooking either simultaneously or successively, comprising a slotted outer shell enclosing a first removable window means, a second removable window means, and a third perforated metallic window means.

The specific details and operation of a preferred embodiment of the invention can be described more easily with the aid of the accompanying drawings in which:

FIG. 3 is an enlarged side view of the feed-adapter of the invention shown in place over the microwave energy source;

FIG. 4 is an enlarged top view of the feed-adapter of the invention shown in place over the microwave energy source;

FIG. 5 is a cross-sectional view of the wire portion of the baking element utilized in the heating apparatus of the invention;

FIG. 6A is a detailed top view of the stirrer apparatus of the invention;

FIG. 6B is a fragmented side view of the stirrer apparatus of the invention;

Figure 1:
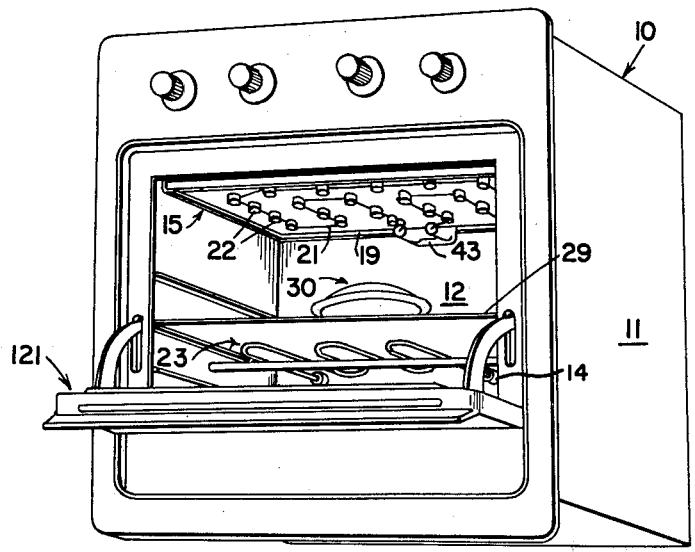
FIG. 1 is a front perspective view of a conventional oven utilizing the microwave feed-adapter system and choke arrangement of the invention.

In FIG. 1 there is shown a conventional electric oven configuration 10 having an external casing 11 and an internal oven cavity 12. Between external casing 11 and internal cavity 12 there is placed thermal insulating material (not shown) for preventing the loss of heat from the oven cavity. The thermal insulating material substantially encloses the side and upper walls of the oven cavity, these regions being most likely to provide paths through which thermal losses may occur.

At the front of the oven shown in FIG. 1, there is provided a suitable access door 121 which, in this preferred embodiment, is shown as opening downwardly and outwardly by means of a conventional hinge arrangement utilized in many electric ovens today and therefore not described in detail here. In the upper region of oven cavity 12 there is mounted a broiler element 15, and in the bottom region of the oven cavity there is shown a baking element 23. As explained more clearly later with reference to FIGS. 2 and 7A, broiler element 15 is of the conventional open-wire unshielded type and utilizes an exposed coiled wire 21 mounted by insulating blocks 22 on a metallic structure 19 which is suitably attached to the rear wall 16 of oven cavity 12. Connections are made from an external power source to the coiled wire element 21 through an insulating plug 43 and jack 24 which is described in more detail with respect to FIGS. 7A and 7B.

Baking element 23 is of the shielded coaxial type, commonly known as a "Calrod" element, and as shown in FIG. 5 in cross-section, has an inner conducting element 25 and an outer metallic sheath element 26. Between inner and outer elements 25 and 26, respectively, there is placed a refractory insulative material 27. Metallic sheath 26 is suitably electrically connected to the metallic rear wall of oven cavity 12 as by soldering the ends of the sheath to metal disks 14 shown in FIG. 1, which in turn are tightly attached to the rear wall 16 so as to provide a good electrical ground for the element. The ends of inner coaxial lead 25 are connected to an external three-wire power source which supplies voltage across the conductors designated $L_1$, $L_2$ and N, more particularly shown in FIG. 2, through plugs mounted in the rear wall of the oven. The inner heater wire 25 is thus operated at a potential other than ground, but because of the grounded outer metallic sheath electromagnetic energy picked up in the oven is not radiated out the oven by means of inner wire 25.

Between the broiler and baking elements there is provided shelf means 29 on which a material 30 to be heated can be placed. Material 30 may be, for example, foodstuffs which are to be cooked. Shelf means 29 is made of a material which is substantially transparent to the transmission of microwave energy as explained further in later paragraphs and may be suitably held by grooved runners 31 or the like as in a conventional electric oven.

In order to provide means for adapting such a conventional oven configuration to use with electromagnetic energy, including microwave energy, to aid in the cooking of material 30, advantage is taken of the fact that space is generally available just below the bottom wall of the oven cavity for placing equipment for generating high frequency or wave energy as can best be seen by a consideration of the sectional view of FIG. 2 taken in connection with the enlarged views of FIGS. 3, 4, 6A and 6B. As shown therein, the electromagnetic energy source 28, such as a magnetron, is coupled to an opening in the rear portion of bottom wall 32 of oven cavity 12. Opening 13 is located substantially centrally on the bottom wall 32.

The energy source 28 has an antenna probe 36 projecting through said opening into the oven cavity 12. A feed-adapter 98, as shown in detail in FIGS. 3 and 4, is provided over the opening to prevent spillage and drippage from entering the energy source 28 and to prevent overcoupling of the energy source as by reflected impedance caused by food bodies in close proximity to the source.

As shown more particularly in FIGS. 3 and 4, feed-adapter 98 comprises an enclosure having an extending metallic top portion 110, three metallic walls 112, 114 and 116, and a front dielectric cover 100 which defines an enclosure over hole 13 in oven floor 32. The adapter 98 rests on three outwardly extending flanges 118, 120 and 122 which are provided with holes shown thereon for passage of bolts or the like used in fastening the adapter 98 to the floor 32 of the oven 12. The bottom interior portion of the adapter is left open so as to provide access for the microwave energy source probe 36 which extends into the oven cavity as aforementioned. The cover 100 consists of a high temperature low-loss dielectric, such as Teflon, which permits the electromagnetic energy to pass from the source into the cavity but prevents entry of spillage and drippage from the cooked products to the energy source. The overhanging or extending top portion 110 prevents overload of the energy source by shielding the energy source from reflected energy which would otherwise be directly reflected into the source upon the introduction of food bodies into the oven at a location directly above the source. The extending portion 110 of the adapter 98 can be looked upon as one side of a waveguide section extending into the oven which serves to direct energy outward in a vertical plane into the oven where it impinges on stirring device 37 which directs the energy upward in a continuously changing mode pattern toward the food 30.

Referring again to FIG. 2, there is shown a stirring device 37 situated adjacent the cover 100 of feed-adapter 98. Stirring device 37 has a plurality of blades attached to a shaft 39 driven by a motor 40 so that the blades rotate within the oven and continuously change the mode pattern distribution within the oven cavity resulting in a uniform distribution of energy. As can be seen in the detail drawings of FIGS. 6A and 6B, the blades 600, 602, 604 and 606 are disposed upward at an angle with respect to the vertical so as to direct most of the energy from source 28 upward into the cavity 12.

The magnetron feed-adapter 98 and mode-stirring system 37 is easily adapted to be attached to a conventional electric oven and is capable of providing a simple means for inserting microwave energy into such a conventional oven in order to improve the cooking versatility thereof. By this construction it is possible to fabricate and sell separate microwave feed system units for adaption to electric ovens currently in use by consumers so as to improve already installed cooking facilities, or it is possible to include the microwave feed system as an added feature being fabricated by conventional oven manufacturers, said feature being capable of installation at the option of the buyer or already included in a basic oven unit. It is further noted that the addition of the microwave heating apparatus of the invention to existing oven structures can be accomplished with a minimum of new tooling.

Figure 2:
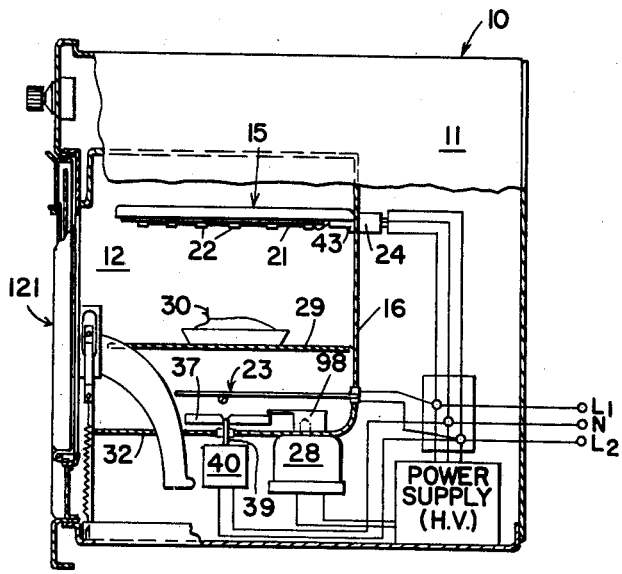
FIG. 2 shows a sectional side view of the oven of FIGURE 1.

As mentioned previously, when microwave energy is introduced into an oven cavity having an unshielded open-wire infrared heater element, such as broiler element 15 of FIGS. 1 and 2, it is possible for the coiled wire element 21 to pick up microwave energy and re-radiate said energy externally of the oven cavity through the connecting wire leads $L_1$, $L_2$ and N. In this way, the leads act substantially as antennae to cause a portion of the energy to be lost from the oven cavity. This invention overcomes the disadvantage by providing a unique structure for preventing the radiation of energy on the heater element connecting leads in the aforesaid manner.

Figure 7A:
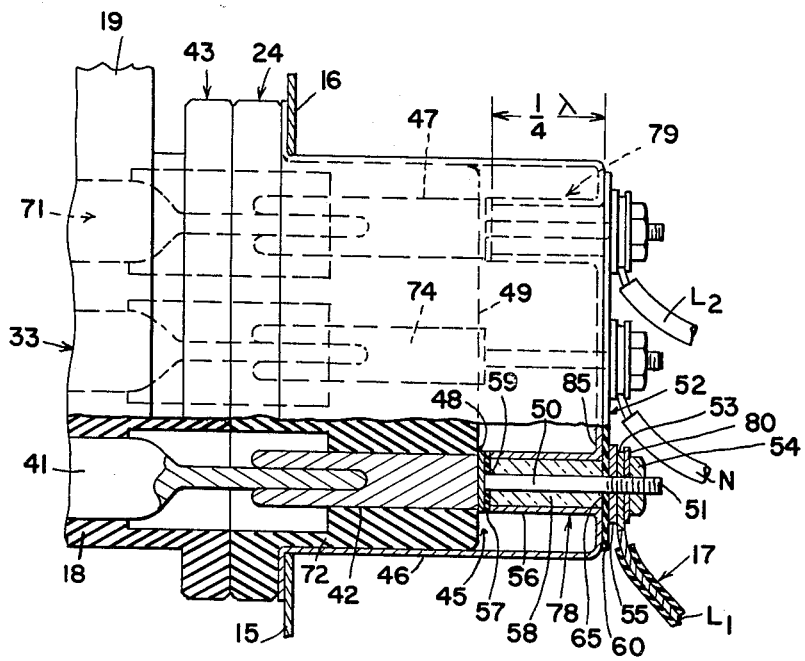
FIG. 7A is a fragmented top view of the choke apparatus of the invention showing the plug and jack in place on the oven wall.

This structure of the invention can be seen more clearly in FIG. 7A which shows an enlarged view of the upper portion of the rear wall 16 of the oven cavity having insulating receptacle jack 24 mounted therein. The two ends of heater coil wire 21 are attached by brazing or by bolting to two metallic knife connectors 41 and 71 which are enclosed in a refractory insulative material 18, such as porcelain, to form the plug assembly 43. The knife connectors 41 and 71 are inserted into corresponding openings or jacks such as jacks 42 and 47 in receptacle jack 24. A central opening or jack 74 in receptacle jack 24 provides a means for inserting a third knife connector 33 from plug 43 which connector is suitably grounded to the interior metallic oven wall 16. This center connection provides an electrical ground "N" for the oven cavity. Receptacle plug 24 is comprised of a refractory insulative material 72, such as porcelain, and, as shown in FIG. 7A in cross-section, includes three inductive spring clip jacks 42, 74 and 47 mounted internally thereof for making contact with the aforementioned knife connectors 41, 33 and 71, respectively, in plug 43. Each of said spring clip jacks are positioned behind each of the openings as shown. These spring clip jacks in a conventional electric oven would be connected directly to suitably mounted terminals to allow external connection for leads $L_1$, $L_2$ and N to an external three-wire power supply (not shown). However, in order to prevent leakage, or external radiation, of microwave energy picked up on the exposed coiled ungrounded wire 21, receptacle plug 24 is constructed as shown in FIG. 7A in accordance with this invention.

In the structure shown, receptacle plug 24 is enclosed by a grounded metallic housing 46 suitably attached to the external surface of rear wall 16 of the oven cavity. Housing 46 is large enough to enclose that portion 45 of the porcelain receptacle that protrudes through the rear wall 16 of the oven. The housing encloses a pair of choke means (one of which is physically shown in cross-section in FIG. 7A and schematically in FIG. 7B) connected to each of the ungrounded heater coil wire ends through the aforesaid jacks 42 and 47. For clarity, only one of such choke means, designated generally by the reference numeral 78, is described in detail with reference to FIGS. 7A and 7B. A second identical choke means 79 is utilized in connection with the other of said coiled wire leads and is shown in dotted lines in FIG. 7A.

In accordance with the invention, spring clip connection or jack 42 is conductively attached at its outer end to a metallic disc 48 which is, in turn, suitably attached to the rear external wall 49 of porcelain receptacle plug 24 by conventional bonding means. Extending outwardly from and attached to the central portion of metallic disc 48 there is a conductive rod 50 having a threaded end 51 protruding from the rear wall 52 of housing 46. Threaded end 51 acts as a suitable terminal for connecting a wire lead 17 to an external source of heater coil voltage $L_1$ from a supply (not shown). Lead 17 has a spade lug 53 attached thereto, said lug engaging the threaded end 51 of rod 50. Spade lug 53 is held on the rod by a threaded terminal cap 54 spaced apart from lug 53 by lock-washer 80 so that when the cap and spade lug are positioned on the end of rod 50, the spade lug firmly contacts a metallic washer 55 placed over the end of the rod abutting the rear external wall 52 of housing 46.

Conductive rod 50 acts as the inner conductor of a coaxial line which has an outer conductor in the form of a tubular metal sheath 56 suitably attached as by soldering or welding at one end to the inner surface 85 of rear wall 52 of housing 46 and at the other end to an insulating disc 57 which is positioned between said other end and metal disc 48. A suitable insulation material 58, such as Teflon, mica or other suitable electrical insulating compositions, is placed between inner rod 50 and outer sheath 56. The length of the coaxial line made up of outer conductor 56 and inner conductor 50 is substantially equal to one-quarter of the wavelength of the high frequency energy that is being inserted into the oven cavity from energy generating source 35 discussed above with respect to FIG. 1. This length is shown by the notation $\lambda/4$ on the drawing, and, of course, is dependent on the dielectric characteristic of the particular medium in which the electromagnetic energy is propagated. At the outer end of coaxial choke device 78, metal washer 55, insulating strip 60 and rear wall 85 act as a grounded capacitance providing a capacitive short for the outer end of coaxial choke device 78. Because of the particular structure shown, a maximum voltage exists at the inner end of coaxial choke device 78 at the point 59 and a minimum voltage exists at the outer end of the coaxial line at the point 65 so that the field in the region of point 65 is substantially zero.

The physical length of the coaxial transmission line portion of the choke arrangement shown in FIG. 7A depends on the frequency of the microwave energy which is being inserted into the oven cavity and upon the dielectric constant of the insulative material 58 utilized between its inner and outer conductors. The length required can be calculated in accordance with the following formula:

Coaxial line length=$\lambda/4\sqrt{K}$, wherein $\lambda$ is the wavelength of the electromagnetic energy in free-space and K is the dielectric constant of the insulative material 58 utilized in the coaxial line choke structure.

Figure 7B:
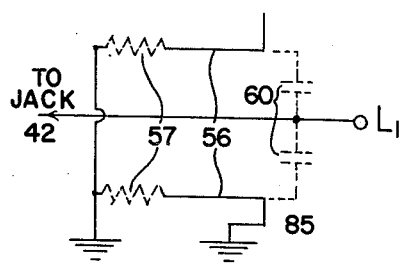
FIG. 7B is a schematic representation of the choke arrangement of the invention.

FIG. 7B represents schematically the electrical connection of the choke arrangement of the invention. As can be seen, inner conductor 50 corresponding to rod 50 of FIG. 7A is surrounded by outer conductor 56 which is grounded by connection to inner wall 85 of casing 46. Between wall 85 and inner conductor 50 a capacitive short for high frequency signals exists because of the capacitive effect of insulating strip 60. Thus, the high frequency voltage present at the $L_1$ end of inner conductor 50 and which is made to be a minimum at that end by making the coaxial line length equal to $1/4\lambda$ is effectively shorted to ground so as to eliminate radiation of said energy to the exterior.

By the use of such a choke structure as shown in FIGS. 7A and 7B for both of the ungrounded input leads to unshielded open-wire broiler element 15, microwave energy present within the oven cavity is prevented from being radiated outside the cavity.

Although the baking or lower element 23 is shown in this particular embodiment as a sheathed, conductive element having its tubular shield 27 of FIG. 5 connected to electrical ground at the oven cavity, the choke arrangement of the invention is equally adaptable to a baking element that is fabricated as an open-wire or unshielded type of element as described above with reference to broiler element 15. Moreover, the choke arrangement can also be utilized with other exposed wire devices which may be utilized within the oven and supplied from an external voltage source. Such other elements may be, for example, infrared lamps, temperature sensing devices and the like.

Figure 8:
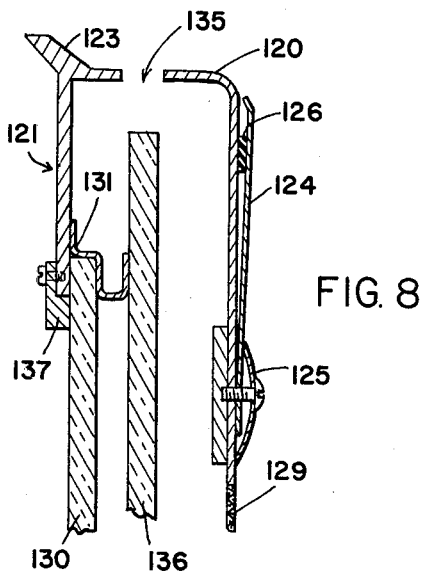
FIG. 8 is a sectional view of a portion of the oven door of the invention.

When thermal and microwave energy are to be used in the same oven cavity it is desirable to provide a door structure which is compatible to both thermal and microwave energy and which provides proper venting for the oven during cooking. Such an oven door structure is provided by door 121 shown in vertical cross-section in FIG. 8. The door 121 shown in FIG. 8 has a metallic rear panel 120 and a front cover portion 123 attached thereto. In order to prevent leakage of microwave energy through the oven door configuration it is necessary to provide metal-to-metal contact between the interior surface of the door and the front of the oven. Good metallic contact is provided by a flexible metallic contact piece 124 attached to the center of the rear panel 120 of door 121 by a contact retaining bezel 125. A silicon rubber strip 126 is positioned between contact piece 124 and rear panel 120. Similar contact piece devices are arranged around the periphery of the door on all four sides. The central region of the lower portion of rear panel 122 has a plurality of perforations such as may be formed by a wire mesh screen 129 therein to allow for ventilation of hot air from the interior portions of the oven. The diameters of such openings are substantially less than the wavelength of the microwave energy in the oven so that only a very small amount of microwave energy is lost through said perforations. The central portion of outer cover 123 of door 121 has a first glass panel 130 held in place by retainer springs 131 at the upper and lower ends. A second glass panel 136 is mounted in parallel spaced relationship with first glass panel 130 in the center portion of the door enclosure, as shown in FIG. 8.

The use of the glass partitions and perforations allows an observer to view the interior of the oven while insulating the observer from the microwave or other energy within the oven. A slotted opening 135 is provided along the top surface of outer cover 123. In this way ventilation is provided through the perforations of screen 129 outwardly through the top of the door by way of opening 135. Such a construction as shown in the figure also allows inner glass panel 136 to be slid out through opening 135 so that it may be easily cleaned. Front glass panel 130 can be cleaned by sliding it outwardly through the opening provided in the front of the door cover upon removal of retaining bezel 137. The combination of two glass panels 130 and 136 provides excellent thermal insulation so that little heat is lost through the door of the oven. Since a small amount of air is always moving upward over the glass during operation of the oven, fogging of the glass panel will be prevented.

Figure 9:
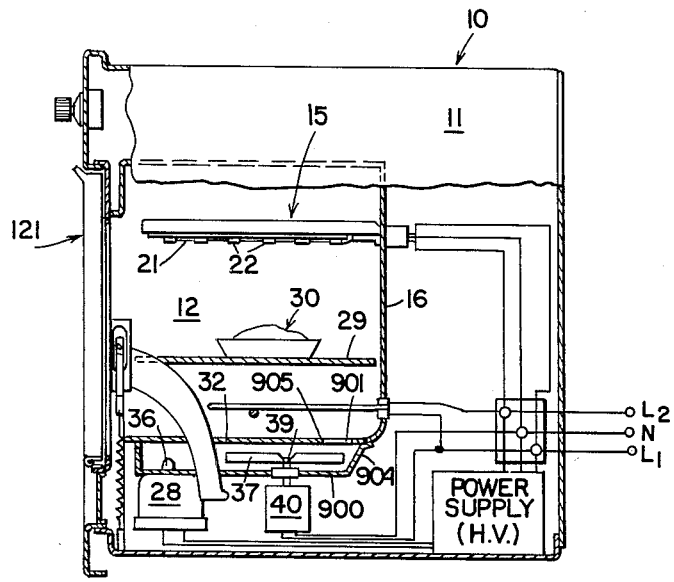
FIG. 9 shows a sectional view of an alternate embodiment of the oven apparatus of the invention.
Figure 10:
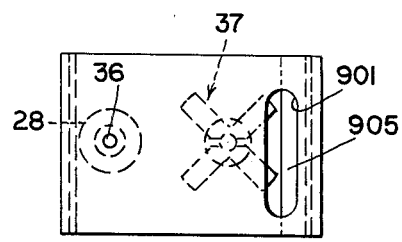
FIG. 10 shows a top view of the waveguide apparatus of the alternate embodiment.

FIGS. 9 and 10 illustrate a further embodiment of the invention in which a waveguide 900 is mounted adjacent bottom wall 32 and has a corresponding opening at its right hand end so that energy propagated down the waveguide can be fed through opening 901 into oven cavity 12. In order to enhance the operation of the microwave feed system, the waveguide is constructed so as to have a reflecting surface 904 at the end of the waveguide making an angle with respect to the direction of propagation of the energy. Electromagnetic energy is provided by a generating source, such as magnetron 28, having an antenna probe 36 projecting through an opening into the left-hand end of waveguide 900 in a conventional manner as shown. Electromagnetic energy is then propagated down the waveguide, and thence through opening 901 into oven cavity 12. In order to improve the mode distribution of the electromagnetic energy within the oven cavity and provide uniform heating of the material 30, a mode-stirring device 906 is positioned in waveguide 900 near opening 901 as shown. A low-loss dielectric cover 905 is positioned within opening 901 so as to prevent drippage and spillage into waveguide 900.

Although the embodiments of the oven shown in the figures and discussed above represent preferred configurations of the invention, other variations in the basic structure will occur to those in the art within the intended scope of the invention. For example, the choke device can be made any odd integral number of one-quarter wavelengths long and still satisfy the requirement of radiation suppression. Hence, the invention is not to be limited to the specific embodiments shown and described herein except as defined by the appended claims.

What is claimed is:
1. In combination:
a metallic enclosure defining a cavity adapted to receive a body to be heated;
source means for supplying high frequency electromagnetic wave energy to the interior of said cavity;
at least one electric element having a conductive member exposed to said electromagnetic wave energy mounted within said enclosure;
energy supplying means, external to said enclosure, for supplying electrical energy to said conductive member; and
means, intermediate said energy supplying means and said conductive member, for preventing electromagnetic wave energy from said source means from being radiated externally of said metallic enclosure by said conductive member, including a transmission line having a center conductor comprising an extension of said conductive member, an outer conductor comprising a metallic tube, means for capacitively grounding said tube, said means including said metallic enclosure, a metal washer adjacent thereto, and insulating means between said enclosure and washer and an insulative medium intermediate said center conductor and said outer conductor, the length of said transmission line being substantially equal to an odd number of one-quarter wavelengths of said electromagnetic energy as it passes through said insulative medium.

2. Heating apparatus comprising:
a metallic enclosure defining a cavity adapted to receive a body to be heated and having a top, bottom, rear and side walls;
a source means external to said enclosure for generating high frequency electromagnetic energy and having a coupling probe extending into said cavity through an opening in the bottom wall of said cavity;
feed-adapter means enclosing said probe comprising an enclosure having a metallic top wall, three metallic side walls and a fourth side wall of dielectric material for directing said high frequency electromagnetic energy in a substantially lateral direction through said fourth side wall;
and mode-stirrer means adjacent said fourth side wall for directing electromagnetic energy emanating from said fourth side wall substantially upward towards said body to be heated so as to provide a continuously changing electromagnetic energy wave mode pattern.

3. Heating apparatus comprising:
a metallic enclosure defining a cavity adapted to receive a body to be heated and having a top, bottom, rear and side walls;
waveguide means adapted to support electromagnetic wave energy and positioned external to and in parallel relationship with the bottom wall of said enclosure and having an opening substantially coextensive with an opening in said bottom wall, and a reflective surface adjacent said opening;
source means having a coupling probe extending into said waveguide means for propagating electromagnetic wave energy into said waveguide means;
mode-stirrer means mounted within said waveguide means intermediate said coupling probe and said opening for providing a continuously varying electromagnetic energy mode distribution into said metallic cavity;
and dielectric cover means over said opening to prevent spillage from said metallic cavity from entering said waveguide means.

4. In combination:
a metallic enclosure defining a cavity adapted to receive a body to be heated and having a top, bottom, rear and side walls;
source means external to said enclosure for generating high frequency electromagnetic energy and having a coupling probe extending into said cavity through an opening in the bottom wall of said cavity;

feed-adapter means enclosing said coupling probe comprising an enclosure having a metallic top wall, three metallic side walls and a fourth side wall of dielectric material for directing said high frequency electromagnetic energy in a substantially lateral direction through said fourth side wall;

mode-stirrer means adjacent said fourth side wall for directing electromagnetic energy emanating from said fourth side wall substantially upward towards said body to be heated so as to provide a continuously changing electromagnetic energy wave mode pattern;

at least one electric element having a conductive member exposed to said electromagnetic wave energy mounted within said enclosure;

energy supplying means, external to said enclosure, for supplying electrical energy to said conductive member;

and means, intermediate said energy supplying means and said conductive member for preventing electromagnetic wave energy from said source means from being radiated externally of said metallic enclosure by said conductive member.

5. In combination:

a metallic enclosure defining a cavity adapted to receive a body to be heated and having top, bottom, rear and side walls;

waveguide means adapted to support electromagnetic wave energy and positioned external to and in parallel relationship with the bottom wall of said enclosure and having an opening substantially coextensive with an opening in said bottom wall, and a reflective surface adjacent said opening;

source means having a coupling probe extending into said waveguide means for propagating electromagnetic wave energy into said waveguide means;

mode-stirrer means mounted within said waveguide means intermediate said coupling probe and said opening for providing a continuously varying electromagnetic energy mode distribution into said metallic cavity;

at least one electric element having a conductive member exposed to said electromagnetic wave energy mounted within said enclosure;

energy supplying means, external to said enclosure, for supplying electrical energy to said conductive member;

and means, intermediate said energy supplying means and said conductive member for preventing electromagnetic wave energy from said source means from being radiated externally of said metallic enclosure by said conductive member.

6. In a combination electromagnetic wave energy and radiant energy heating device a door means comprising:

a frame adapted to be coextensive with a corresponding recess in the heating device and enclosing a first removeable viewing window means, a plurality of slot openings about the periphery of said frame, a second removeable viewing window means in parallel spaced apart relation from said first removeable viewing window means so as to entrap a layer of thermally insulative air therebetween, and a third viewing window means of conductive material in parallel spaced apart relation from both said first and second window means having perforations therein of such size in relation to the wavelength of the electromagnetic energy as to substantially prevent passage of the energy through said perforations while permitting passage therethrough of air from within the heating device and outward past said second window means and externally outward from said heating device through said plurality of slot openings thereby to remove moisture accumulation from said first and second window means;

and a flexible metallic spring contact member disposed about the periphery of said frame.

7. In combination:

a metallic enclosure defining a cavity adapted to receive a body to be heated and having a top, bottom, rear and side walls;

source means external to said enclosure for generating high frequency electromagnetic energy and having a coupling probe extending into said cavity through an opening in the bottom wall of said cavity;

feed-adapter means enclosing said probe comprising an enclosure having a metallic top wall, three metallic side walls and a fourth side wall of dielectric material for directing said high frequency electromagnetic energy in a substantially lateral direction through said fourth side wall;

mode-stirrer means adjacent said fourth side wall for directing electromagnetic energy emanating from said fourth side wall substantially upward towards said body to be heated so as to provide a continuously changing electromagnetic energy wave mode pattern;

at least one electric element having a conductive member exposed to said electromagnetic wave energy mounted within said enclosure;

energy supplying means, external to said enclosure, for supplying electrical energy to said conductive member;

means, intermediate said energy supplying means and said conductive member for preventing electromagnetic wave energy from said source means from being radiated externally of said metallic enclosure by said conductive member;

and door means for permitting observation of the interior of said enclosure while preventing egress of electromagnetic wave energy from said enclosure comprising a door frame adapted to be coextensive with an access aperture in said metallic enclosure, said door frame enclosing a first viewing window, a metallic viewing window having perforations therein of size less than the wavelength of the electromagnetic energy generated by said source means, at least one longitudinally extending opening on the periphery of said frame for providing ventilation of heated air caused by operation of said electric element, and a second viewing window intermediate said first viewing window and said metallic viewing window and in spaced parallel relationship therebetween and adapted to be removeable through said longitudinally extending opening.

8. In combination:

a metallic enclosure defining a cavity adapted to receive a body to be heated and having a top, bottom, rear and side walls;

source means external to said enclosure for generating high frequency electromagnetic energy and having a coupling probe extending into said cavity through an opening in the bottom wall of said cavity;

feed-adapter means enclosing said probe comprising an enclosure having a metallic top wall, three metallic side walls and a fourth side wall of dielectric material for directing said high frequency electromagnetic energy in a substantially lateral direction through said fourth side wall;

mode-stirrer means adjacent said fourth side wall for directing electromagnetic energy emanating from said fourth side wall substantially upward towards said body to be heated so as to provide a continuously changing electromagnetic energy wave mode pattern;

at least one electric element having a conductive member exposed to said electromagnetic wave energy mounted within said enclosure;

energy supplying means, external to said enclosure, for supplying electrical energy to said conductive member;

means, intermediate said energy supplying means and said conductive member for preventing electromagnetic wave energy from said source means from being radiated externally of said metallic enclosure by said conductive member;

door means for permitting observation of the interior of said enclosure while preventing egress of electromagnetic wave energy from said enclosure comprising a door frame adapted to be coextensive with an access aperture in said metallic enclosure, said door frame enclosing a first viewing window, a metallic viewing window having perforations therein of size less than the wavelength of the electromagnetic energy generated by said source means, at least one longitudinally extending opening on the periphery of said frame for providing ventilation of heated air caused by operation of said electric element, and a second viewing window intermediate said first viewing window and said metallic viewing window and in spaced parallel relationship therebetween and adapted to be removeable through said longitudinally extending opening;

and contact means disposed about the internal periphery of said door means for providing an electrical short between said door and said access aperture.

9. In combination:

a metallic enclosure defining a cavity adapted to receive a body to be heated and having a top, bottom, rear and side walls;

source means external to said enclosure for generating high frequency electromagnetic energy and having a coupling probe extending into said cavity through an opening in the bottom wall of said cavity;

feed-adapter means forming an enclosure over said coupling probe and having at least one dielectric wall for directing said high frequency electromagnetic energy in a substantially lateral direction;

mode-stirrer means in the path of said laterally directed energy for directing said energy substantially upwards toward said body to be heated in a changing wave mode pattern;

at least one electric element having a conductive member exposed to said electromagnetic wave energy mounted within said enclosure;

energy supplying means, external to said enclosure, for supplying electrical energy to said conductive member;

and means, intermediate said energy supplying means and said conductive member for preventing electromagnetic wave energy from said source means from being radiated externally of said metallic enclosure by said conductive member.

10. In combination:

a metallic enclosure defining a cavity adapted to receive a body to be heated and having a top, bottom, rear and side walls;

source means external to said enclosure for generating high frequency electromagnetic energy and having a coupling probe extending into said cavity through an opening in the bottom wall of said cavity;

feed-adapter means forming an enclosure over said coupling probe and having at least one dielectric wall for directing said high frequency electromagnetic energy in a substantially lateral direction;

mode-stirrer means in the path of said laterally directed energy for directing said energy substantially upwards toward said body to be heated in a changing wave mode pattern;

at least one electric element having a conductive member exposed to said electromagnetic wave energy mounted within said enclosure;

energy supplying means, external to said enclosure, for supplying electrical energy to said conductive member;

and means, intermediate said energy supplying means and said conductive member for preventing electromagnetic wave energy from said source means from being radiated externally of said metallic enclosure by said conductive member, including a transmission line having a center conductor comprising an extension of said conductive member, an outer conductor comprising a capacitive grounded metallic tube and an insulative medium intermediate said center conductor and said outer conductor.

11. In a combination electromagnetic wave energy and radiant energy heating device a door means comprising:

a frame adapted to be coextensive with a corresponding recess in the heating device and enclosing a first viewing window means, a second removeable viewing window means in spaced apart relation from said first viewing window means so as to entrap a layer of thermally insulative air therebetween, a slot opening along the top periphery of said frame being large enough to pass said second viewing window means and a third viewing window means of conductive material in spaced apart relation from said first and second window means having perforations therein of such size in relation to the wavelength of the electromagnetic energy as to substantially prevent passage of the energy through said perforations while permitting passage therethrough of air from within the heating device past said second window means through said slot opening and external to said heating device thereby to remove moisture accumulation from said first and second window means;

and at least one contact member disposed on the periphery of said frame.

References Cited by the Examiner

UNITED STATES PATENTS

| | | | |
|---|---|---|---|
| 2,453,716 | 11/48 | Llewellyn | 333—82 |
| 2,474,260 | 6/49 | Leef | 333—82 |
| 2,831,952 | 4/58 | Warner | 219—10.55 X |
| 2,889,825 | 6/59 | Evans | 126—198 |
| 2,912,554 | 11/59 | Snyder | 219—10.55 |
| 2,958,754 | 11/60 | Hahn | 219—10.55 |
| 2,961,520 | 11/60 | Long | 219—10.55 |
| 2,993,973 | 7/61 | Johnson et al. | 219—10.55 |
| 3,057,341 | 10/62 | Perl | 126—198 |
| 3,081,392 | 3/63 | Warner | 219—10.55 |
| 3,106,629 | 10/63 | Schall | 219—10.55 |
| 3,127,495 | 3/64 | Polries et al. | 219—10.55 |

FOREIGN PATENTS

| | | |
|---|---|---|
| 219,734 | 2/62 | Austria. |
| 941,434 | 11/63 | Great Britain. |

RICHARD M. WOOD, *Primary Examiner.*